United States Patent
Yokoyama et al.

(10) Patent No.: US 6,743,834 B2
(45) Date of Patent: Jun. 1, 2004

(54) ANIONIC ELECTRODEPOSITION COATING COMPOSITION

(75) Inventors: Tetsuya Yokoyama, Hiratsuka (JP); Kamikado Koji, Yokohama (JP)

(73) Assignee: Kansai Taint Co., Ltd., Hyogo-Ken (JP)

( * ) Notice: Subject to any disclaimer, the term of this patent is extended or adjusted under 35 U.S.C. 154(b) by 266 days.

(21) Appl. No.: 09/974,628

(22) Filed: Oct. 10, 2001

(65) Prior Publication Data

US 2002/0068176 A1 Jun. 6, 2002

(30) Foreign Application Priority Data

Oct. 11, 2000 (JP) .......................................... 2000-309977

(51) Int. Cl.$^7$ ............................................... C08L 43/04
(52) U.S. Cl. ..................... 523/203; 523/212; 524/837; 525/70; 525/78; 525/80; 525/124; 525/125; 525/191; 525/221; 525/222; 525/243; 525/288; 525/902; 526/279; 528/35
(58) Field of Search ............................ 528/35; 524/837; 525/70, 78, 80, 124, 125, 191, 221, 222, 243, 288, 902, 326.5, 329.7, 374, 381; 526/279; 523/201, 202, 203; 428/446, 450

(56) References Cited

U.S. PATENT DOCUMENTS 4,980,409 A * 12/1990 Harakawa et al. .......... 524/510
5,332,766 A * 7/1994 Takaya et al. .............. 523/201

FOREIGN PATENT DOCUMENTS

| JP | 3139574 | 6/1991 |
| JP | 5263296 | 10/1993 |
| JP | 6-24519 | 8/1994 |

* cited by examiner

Primary Examiner—Margaret G. Moore
Assistant Examiner—Marc S. Zimmer
(74) Attorney, Agent, or Firm—Huntley & Associates, LLC

(57) ABSTRACT

Anionic electrodeposition coating compositions for forming matte films containing acrylic resin; alkoxysilyl group containing emulsified polymer produced by a multiple stage emulsion polymerization of unsaturated monomer in the presence of water and a emulsifier, wherein the unsaturated monomer containing alkoxysilyl group-containing unsaturated monomer is present in an amount of 5 to 40% by weight based on a total amount of all the unsaturated monomers used in the multiple stage emulsion polymerization; and crosslinking agent.

10 Claims, No Drawings

ANIONIC ELECTRODEPOSITION COATING COMPOSITION

BACKGROUND OF THE INVENTION

1. Field of the Invention

The present invention relates to anionic electrodeposition coating compositions which are capable of forming matte films having good film performance characteristics such as finish appearance, storage stability, adhesion, and hardness.

2. Description of the Background Art

It is desirable to coat substrates such as aluminum sash with anionic electrodeposition coating compositions to give a good film appearance. Examples of anionic electrodeposition coating compositions which have been previously used are described in Japanese Patent Publication No. 24519/87. That publication discloses a process for forming a matte coating film by use of an anionic electrodeposition coating composition comprising an alkoxysilyl group-containing vinyl copolymer as a base resin and amino resin as a curing agent.

The coating composition used in the above process is such that the acrylic copolymer used as the base resin has alkoxysilyl group on its side chain and the alkoxysilyl group is gradually hydrolyzed to form silanol on water solubilization or making water dispersion, and further condensation between the silanols forms siloxane linkage, resulting in forming fine dispersion particles having an interparticle gel structure. As the result, when the fine dispersion particles are subjected to anionic electrodeposition coating, a film having a fine coarse surface is formed and even if heat-cured, the film keeps the coarse surface without forming a complete melt flow to form a good matte coating film.

For the reasons discussed above, these compositions are widely used in the art. However, in these coating compositions, it is difficult to control the gloss of the final film, and it would be desirable to improve the storage stability of the alkoxysilyl group-containing acrylic copolymer.

Other coating compositions are described in Japanese Laid-open Patent Application No. 139574/91 and Japanese Laid-open Patent Application No. 263296/93. These coating compositions comprise an acrylic copolymer and a crosslinked particle resin. With these compositions, it is possible to control the degree of matte and the electrodeposition film performance characteristics. However, when a low gloss film appearance is desired, a high concentration of the crosslinked particle is needed, and this can result in unsatisfactory adhesion and hardness.

SUMMARY OF THE INVENTION

The present invention to provides an anionic electrodeposition coating composition for forming matte film which exhibits good storage stability and forms a matte film having good adhesion and hardness.

Specifically the present invention provides an anionic electrodeposition coating composition comprising (a) about from 20 to 70% by weight of acrylic resin; (b) about from 5 to 40% by weight of emulsified polymer containing alkoxysilyl groups and produced by a multiple stage emulsion polymerization of unsaturated monomers, wherein about from 5 to 40% by weight of the unsaturated monomers used in the multiple stage emulsion polymerization contain alkoxysilyl groups, and the polymerization is carried out in the presence of water and emulsifier; and (c) about from 20 to 60% by weight of at least one crosslinking agent.

DETAILED DESCRIPTION OF THE INVENTION

The anionic electrodeposition coating composition for forming matte film used in the present invention contains acrylic resin, alkoxysilyl-group containing emulsified polymer, and at least one crosslinking agent.

Acrylic Resin

The acrylic resin used in the present invention is present in an amount of about from 20 to 70% by weight. The acrylic resin preferably has an acid value of about from 5 to 150 mg KOH/g, and especially about from 20 to 70 mg KOH/g, and a hydroxyl value of about from 5 to 150 mg KOH/g, preferably about from 30 to 100 mg KOH/g. When the acid value is less than about 5 mg KOH/g, water dispersibility is reduced. On the other hand, with more than about 150 mg KOH/g, resistance of the film is poor. When the hydroxyl value is less than about 5 mg KOH/g, curing properties are reduced, resulting in poor film hardness. On the other hand, when more than 150 mg KOH/g, a large amount of unreacted hydroxyl groups may remain in the film, resulting in poor durability.

The acrylic resin is prepared by radical polymerization of unsaturated monomers in organic solvent in the presence of radical polymerization catalyst. The monomers used can vary widely, and can be selected from the following groups of monomers:

Hydroxyl group-containing unsaturated monomers, for example, C2–C8 hydroxyalkylesters of (meth)acrylic acid, such as 2-hydroxyethyl(meth)acrylate, 2-hydroxypropyl(meth)acrylate, 3-hydroxypropyl (meth)acrylate, hydroxybutyl(meth)acrylate; other hydroxyl group-containing unsaturated monomers; such as caprolactone modified (meth)acrylic acid hydroxyesters, all marketed by Daicel Chemical Industries, Ltd. under the trade names Placcel FMI, Placcel FM2, Placcel FM3, Plac6el FA1, Placcel FA2, and Placcel FA3, N-methylolacrylamide, and the like. The above monomers can be used alone or in combination. The above monomers introduce hydroxy groups into the acrylic resin. These can react with the crosslinking agents mentioned below.

Carboxylic group- containing unsaturated monomers, for example, acrylic acid, methacrylic acid, maleic acid, maleic anhydride, fumaric acid, crotonic acid, itaconic acid, and the like. The above monomers introduce carboxyl groups into the acrylic resin, so that the acrylic resin can be dispersed in water by neutralization. The above monomers can be used alone or in combination.

Other unsaturated monomers such as C1–C24 alkyl or cycloalkyl esters of (meth)acrylic acid, such as methyl (meth)acrylate, ethyl(meth)acrylate, n, i-propyl(meth) acrylate, n-,i-,t-butyl(meth)acrylate, 2-ethylhexyl(meth) acrylate, cyclohexyl (meth) acrylate, and the like; aromatic vinyl monomers, such as styrene α-methylstyrene, vinyltoluene; (meth)acrylamide, N-butoxymethylacrylamide, and the like. The above monomers can be used alone or in combination.

The acrylic resin can be prepared by copolymerizing two or more unsaturated monomers. Examples of such compounds having two or more unsaturated groups in the molecule include allyl(meth)acrylate, ethyleneglycoldi (meth)acrylate, diethyleneglycoldi-(meth)acrylate, triethyleneglycoldi(meth)acrylate, tetraethyleneglycoldi (meth)acrylate, butyleneglycoldi(meth)acrylate butyleneglycoldi(meth)acrylate, butanedioldi(meth)

acrylate, glyceroltri(meth)acrylate, trimethyrolpropanedi(meth)acrylate, trimethyrolpropanetri-(meth)acrylate, pentaerythritoldi(meth)acrylate, pentaerythritoltri(meth)acrylate, pentaerythritoltetra(meth)acrylate, dipentaerythritolpenta(meth)acrylate, hydroxyisocyanuratetri(meth)acrylate, neopentylglycoldiacrylate, 1,6-hexanedioldiacrylate, glycerolallyloxydi(meth)acrylate, 1,1,1-tris(hydroxymethyl)ethanedi(meth)acrylate, 1,1,1-tris(hydroxymethyl)ethanetri(meth)acrylate, triallylisocyanurate, triallyltrimesate, diallylterephthalate, diallylphthalate, diallylisophthalate, pentaerythritoldiallylether, divinylbenzene, and the like.

Acrylic resin prepared by copolymerizing two or more unsaturated monomers exhibits the characteristics of a macromolecule and a multi divergence structure to some extent. This improves the dispersion ability of the acrylic resin with crosslinking agents as well as the storage stability of the final coating composition. In the present invention, when melamine resin is used as a crosslinking agent, it is preferable to use triallylisocyanurate as the compound in the preparation of the acrylic resin. This results in particularly good stability of the coating composition.

Alkoxysilyl group-containing unsaturated monomer can be copolymerized in the acrylic resin. The use of this monomer, however, can depreciate storage stability of the acrylic resin, and is accordingly not preferred.

The radical polymerization catalyst used in the preparation of the acrylic resin can vary widely, and can include azo compounds, peroxide compounds, sulfides, sulfines, diazocompounds, nitroso- compounds, and the like. When the acrylic resin is copolymerized from compounds having two or more unsaturated groups in their molecule as described above, a radical polymerization catalyst is preferably used, generally in the range of about from 1 to 5% by weight based on a total amount of all unsaturated monomers used by production of the acrylic resin. The specific amount of radical polymerization catalyst will depend on a kind and amount of the monomer having two or more unsaturated groups in its structure.

In the preparation of the acrylic resin, it is desirable to use a solvent which is capable of dissolving the copolymer being produced and miscible with water so that gelation does not take place during the copolymerization reaction. Examples of such solvents which can be used include ethylene glycol monoethyl ether solvent, diethylene glycol monoethyl ether solvent, ethylene glycol monoethyl ether acetate solvent, alcoholic solvent and the like.

The acrylic resin used in the preparation of the coating compositions of the present invention generally has a solubility parameter (SP) of about from 9.0 to 11.0, preferably 9.1 to 9.5. When the SP is less than about 9.0, the compatibility between the acrylic resin and the crosslinking agents may be too good, resulting in a poor degree of the matte in a film made from the coating composition. On the other hand, when the SP is more than about 11.0, the compatibility between the acrylic resin and the crosslinking agent is reduced, resulting in poor storage stability of the coating composition.

The acrylic resin used in the coating composition preferably has a weight average molecular weight of about from 5,000 to 150,000. When the weight average molecular weight is less than about 5,000, a film obtained from composition has high gloss and not the desired matte finish, and the weather resistance and application properties become poor. On the other hand, a weight average molecular weight of more than about 150,000 results in poor film uniformity.

Emulsified Polymer Containing Alkoxysilyl Groups

A second component of the compositions of the present invention is about from 5 to 40% by weight of emulsified polymer containing alkoxysilyl groups and which is produced by a multiple stage emulsion polymerization of unsaturated monomer containing alkoxysilyl group-containing unsaturated monomer in the presence of water and an emulsifier. One such polymerization is a two stage polymerization to produce a shell-core polymer. Such a procedure comprises first subjecting a monomer mixture destined to form a core-component to the first stage of emulsion polymerization using polymerization catalyst in the presence of an emulsifier and water, thereby obtaining an aqueous dispersion; and then subjecting a monomer mixture destined to form a shell-component to the second stage of emulsion polymerization sequentially in the aqueous dispersion similarly by using an emulsifier, water and a polymerization catalyst. This procedure produces an aqueous dispersion of emulsified polymer particles generally having a core-shell construction.

Examples of alkoxysilyl group-containing unsaturated monomers which can be used include divinyldimethoxysilane, divinyl di-β-methoxyethoxysilane, vinyltrimethoxysilane, vinyl triethoxysilane, vinyltris-β-methoxyethoxysilane, γ-methacryloxypropyltrimethoxy silane, γ-methacryloxypropyltriethoxysilane, and the like. These monomers can be used alone or in combination.

The amount of alkoxysilyl group-containing unsaturated monomer used is generally in the range of about from 5 to 40% by weight, preferably about from 10 to 40% by weight, based on a total amount of all the unsaturated monomers used in the multiple stage emulsion polymerization. Less than about 5% by weight results in a poor degree of the matte in a film resulting from the coating. On the other hand, more than about 40% by weight, results in poor stability of the emulsion resulting from the polymerization.

It is preferred that the alkoxysilyl group-containing unsaturated monomer in used in the preparation of the last stage of emulsion polymerization in the multiple stage emulsion polymerization is about from 20 to 90% by weight, and especially about from 20 to 60% by weight based on a total amount of the unsaturated monomers used in that last stage. Using less than about 20% by weight results in a poor degree of matte in film prepared from the coating composition. On the other hand, more than about 90% by weight results in poor stability of the emulsion polymerization.

It is preferable that at least one compound having two or more unsaturated groups in its molecule be copolymerized into the emulsified polymer containing alkoxysilyl groups. This copolymerized compound having two or more unsaturated groups should be present in an amount of about from 5 to 40% by weight, preferably about from 10 to 30% by weight based on a total amount of unsaturated monomers used in the first stage emulsion polymerization in the multiple stage emulsion polymerization. This results in crosslinking which improves storage stability and the matte finish of films resulting from the present coating compositions. When the amount of these compounds containing two or more unsaturated groups is less than about 5% by weight, the storage stability and the degree of matte in the resulting film are poor. On the other hand, when this component is present in an amount of more than about 40% by weight, the stability of the emulsion polymerization is poor.

These compounds having two or more unsaturated groups can be used in combination with the other components used for the preparation of acrylic polymers as generally described above, and particularly those having two or more unsaturated groups in the molecule.

It is especially preferred that hydroxy group-containing unsaturated monomer is copolymerized into the emulsified polymer containing alkoxysilyl groups described above. This provides crosslinking properties and improves the storage stability of the emulsified polymer particles. It is especially preferably for emulsified polymer to have a hydroxy value of about from 2 to 40 mg KOH/g. Less than about 2 mg KOH/g results in poor crosslinking properties and storage stability. On the other hand, a hydroxy value of more than about 40 mg KOH/g results in poor storage stability of the emulsifired polymer.

Examples of emulsifiers which can be used may include non-reactive emulsifiers having the sodium salt or ammonium salt of sulfate group, sulfonic acid group, or phosphate group; and the reactive emulsifiers having at least one of these groups, and the like. Those reactive emulsifiers having ammonium salt and unsaturated groups in their molecular structure provide a good degree of matte and performance, and are accordingly preferred. The amount of the emulsifier will necessarily vary with the polymer and solvent system used, but is preferably in the range of about from 0.5% to 5% by weight based on a total amount of all the unsaturated monomers used in the multiple stage polymerization of production of the emulsified polymer.

Examples of the radical polymerization catalysts which can be used include organic azo- compounds such as potassium persulfate, sodium persulfate, ammonium persulfate, 4,4'-azobis(4-cyanopentanoic acid), and 2,2'-Azobis[2-methyl-N-(2 hydroxyethyl)propionamide]; peroxides such as benzoyl peroxide, and di-tert-butylhydroperoxide. These catalysts can be used in combination with a redox catalyst. It is preferable to use these catalysts in an amount of about from 0.1% to 1.0% by weight based on a total amount of all the unsaturated monomers used in the multiple stage polymerization of production of emulsified polymer.

Crosslinking Agents

Crosslinking agents which can be used in the preparation of the coating compositions of the present invention can vary widely. The crosslinking agents preferably are compatible with the acrylic resin with the aid of one or more common organic solvent. The crosslinking agents generally are not completely compatible with the acrylic resin. It has been found that complete compatibility interferes with the desirable matte finish of the coatings prepared from the present compositions. Typical crosslinking agents which can be used in the present invention include melamine resin and/or blocked polyisocyanates. These crosslinking agents react hydroxy groups in the acrylic resin and the emulsified polymer to form a crosslinked film.

In the formulation of a coating composition of the present invention, the acrylic resin is formulated with at least one crosslinking agent in a solid weight ratio of acrylic resin to crosslinking agent of about 40/60. Amine compound is then added in an amount of about 1.0 equivalent relative to the carboxyl groups of the acrylic resin, and water is then added to form an aqueous dispersion having a solid content of about 20% by weight.

The resulting aqueous dispersion can then be coated onto a transparent glass plate to a thickness of 10 μm as a dry film, followed by removing the solvent by evaporation at room temperature to 100° C., and further by drying at a temperature 150° C. to 200° C. for 5 to 10 minutes. When the resulting film is hazy to the naked eye, this is an indication that the crosslinking agent does not have complete compatibility with the acrylic resin. Further, quantitatively, it may be defined that the crosslinking agent does not have complete compatibility with the acrylic resin when a percentage transmittance measured on the film obtained as above at a wavelength of 4000 Å A by use of a spectrophtometer is 95% or less, particularly 50 to 90%.

The melamine resins which can be used in the present invention include those modified with at least one alcohol such as methanol, ethanol, propanol, butanol, octyl alcohol, 2-ethylhexyl alcohol and the like, preferably $C_3$ or higher, more preferably $C_4$ to $C_{18}$. The melamine resin preferably contains an ether group modified by $C_3$ or higher alcohol in an amount of, on average, about 2 or more, particularly about from 2 to 5 per one nucleus of triazine ring.

The blocked polyisocyanate compounds used in the present invention include those known in the art, for example, those obtained by blocking aliphatic, alicyclic or aromatic polyisocyanate compounds such as isophorone diisocyanate, hexamethylene diisocyanate 2,4-tolylenediisocyanate, 2,6-tolylenediisocyanate, and 4,4-diphenylmethanediisocyanate, with lactones such as ε-caprolactone or with alcohols such as propanol, butanol, pentanol, benzyl alcohol and oximes such as methylethylketoxime and methylisobutylketoxime.

Anionic Electrodeposition Coating Composition for Forming Matte Film

In the preparation of anionic electrodeposition coating compositions for forming matte films, the acrylic resin, alkoxysilyl group-containing emulsified polymer, and crosslinking agent are admixed. These components should generally be present, based on a total amount of solids of all three components, in an amount of about from 20 to 70% by weight, preferably 30 to 60% by weight, of acrylic resin; about from 5 to 40% by weight, preferably 10 to 20% by weight, of emulsified polymer containing alkoxysilyl groups; and about from 20 to 60% by weight, preferably 30 to 50% by weight, of at least one crosslinking agent. The use of less than about 20% by weight of acrylic resin reduces film weather resistance. On the other hand, when more than 70% by weight is used, the film uniformity can be markedly reduced, and the degree of matte in the cured coating is poor. When less than about 5% by weight of the emulsified polymer containing alkoxysilyl groups is used, the degree of matte degree of the cured film is poor. On the other hand, the use of more than about 40% by weight of this component results in poor film uniformity. When less than about 20% of the crosslinking agent is used, the crosslinking properties of the resulting film and the degree of matte are poor. On the other hand when more than about 60% by weight of crosslinking agent is used, the degree of matte degree and the film weather resistance are poor.

The coating compositions of the present invention can be prepared by adding a neutralizing agent to the acrylic resin followed by water-dispersing, and then adding emulsified polymer and crosslinking agent to the dispersion. Another method is mixing acrylic resin with crosslinking agent, followed by neutralizing and water-dispersing, and then adding emulsified polymer into the dispersion.

The coating compositions of the present invention may also contain curing/dissociation catalysts, pigments, filler, pigment dispersing agent, wetting agent, defoamer, plasticizer, organic solvents, antiseptic, mold inhibitor, pH regulating agent, rust inhibitor, and the like. These may be selected and used alone or in combination.

The coating composition of the present invention can be coated onto various kinds of metal materials such as aluminum, aluminum alloy, anodized aluminum, steel; steel sheet plated with zinc, tin, chromium, and aluminum; steel sheet subjected to a chemical treatment with chromic acid or phosphoric acid, or cathodic electrochemical treatment. The coating compositions of the present invention are particularly useful for coating aluminum building materials, including colored or non-colored anodized aluminum. The coating compositions can be applied, for example, by incorporating the coating composition into an anionic electrodeposition coating bath having a solids content of about from 5 to 20% by weight, and preferably about from 6 to 12% by weight, followed by dipping a metal material such as aluminum into the bath, carrying out an anionic electrodeposition coating to provide a dry film thickness of about from 5 to 30 μm, preferably washing with a tap water, a permeated water and the like, and heat curing at a temperature of about from 160 to 200° C. for about from 20 to 40 minutes.

The present invention is explained in greater detail by the following Examples and Comparative Examples, but should not be limited thereto. In these Examples, parts and percentages are by weight unless otherwise indicated.

Preparation of Acrylic Resin

Preparation Example 1

A reactor equipped with a thermometer, a thermostat, a reflux condenser and a drop device was charged with 100 parts of isopropyl alcohol, 150 parts of n-butyl alcohol and 100 parts of butyl ethylene glycol monoethyl ether and kept at 85° C. A mixture of 50 parts of styrene, 200 parts of methyl methacrylate, 100 parts of n-butylacrylate, 50 parts of ethylacrylate, 70 parts of 2-hydroxyethylacrylate, 30 parts of acrylic acid, and 4 parts of azobisdimethylvaleronitrile was then added to the reactor dropwise over a period of 3 hours, followed by adding 5 parts of azobisdimethylvaleronitrile. The resulting mixture was maintained at a temperature of 85° C. for 3 hours to obtain an acrylic resin (A-1) varnish having a solids content of 59% by weight. The resulting resin had a weight average molecular weight of about 50,000, an acid value of 46 mg KOH/g, a hydroxy value of 67 mg KOH/g, and an SP of 9.49.

Preparation Example 2

A reactor equipped a thermometer, a thermostat, a reflux condenser and a drop device was charged with 100 parts of isopropyl alcohol and 150 parts of n-butyl alcohol and 100 parts of butyl ethylene glycol monoethyl ether and kept at 85° C. A mixture of 50 parts of styrene, 190 parts of methyl methacrylate, 100 parts of n-butylacrylate, 50 parts of ethylacrylate, 70 parts of 2-hydroxyethylacrylate, 30 parts of acrylic acid, 10 parts of triallylisocyanurate and 4 parts of azobisdimethylvaleronitrile was then added to the reactor dropwise over a period of 3 hours, followed by adding 5 parts of azobisdimethylvaleronitrile. The resulting mixture was maintained at a temperature of 85° C. for 3 hours to obtain an acrylic resin (A-2) varnish having a solids content of 59% by weight. The resulting resin had a weight average molecular weight of about 60,000, an acid value of 46 mg KOH/g, a hydroxy value of 67 mg KOH/g, and an SP of 9.49.

Preparation of Emulsified Polymer

Preparation Example 3

A reactor equipped with a thermometer, a thermostat, a reflux condenser and a drop device was charged with 298 parts of deionized water and kept at 90° C. A catalyst solution was added to the reactor comprising 0.15 parts of 2,2'-Azobis[2-methyl-N-(2-hydroxyethyl)propionamide] nonionic water soluble catalyst commercially available from Waco Pure Chemical Industries, Ltd. under the trade name VA-086; and 9.8 parts of deionized water, and mixed for 15 minutes at 90° C. Another container was charged with 1 part of reactive ammoniun sulfate emulsifier commercially available from Asahi Denka Kogyo, K. K. under the trade name SE-10N, 30 parts of deionized water, 22 parts of styrene, 22 parts of n-butylacrylate, 2 parts of 1,6 hexanedioldiacrylate, and 4 parts of γ-methacryloxypropyltrimethoxysilane commercially available from Shin-Etsu Chemical Co., Ltd., under the trade name KBM-503, followed by mixing to prepare an emulsified monomer (1). The emulsified monomer (1) was then added into the reactor dropwise over a period of 2 hours at 90° C. At the same time, the catalyst solution of 0.55 parts of VA-086 and 29.45 parts of deionized water was added dropwise to the reactor over a period of 5.5 hours.

After the addition of emulsified monomer (1), and after reaction for 30 minutes, emulsified monomer (2) was added dropwise into the reactor over a period of two hours while the reactor was maintained at 90° C. Emulsified monomer (2) was separately prepared from 1 part of SE-10N reactive ammonium sulfate emulsifier, 30 parts of deionized water, 16 parts of styrene, 16 parts of n-butylacrylate, 2 parts of 1,6-hexanedioldiacrylate, 14 parts of γ-methacryloxypropyltrimethoxysilane commercially available from Shin-Etsu Chemical Co., Ltd., under the trade name KBM-503, and 2 parts of 2-hydroxyethylacrylate.

The resulting mixture was reacted for 1 hour to obtain a milk-white emulsified polymer (B-1). The resulting emulsified polymer (B-1) had a solids content of 20% by weight, and an average particle size of 120 nm.

Preparation Examples 4–7

Emulsified polymers (B-2)-(B-5) were prepared in the same manner as Preparation Example 3 according to the formulations of emulsified monomer (1) and emulsified monomer (2) shown in the following Table 1.

|  |  |  | Preparation Example | | | | |
|---|---|---|---|---|---|---|---|
|  |  |  | 3 | 4 | 5 | 6 | 7 |
| Name of Emulsified Polymer | | | B-1 | B-2 | B-3 | B-4 | B-5 |
| Formulations | Emulsified Monomer (1) | [SE-10N] | 1 | 1 | 1 | 1 | 1 |
|  |  | Deionized water | 30 | 30 | 30 | 30 | 30 |
|  |  | Styrene | 22 | 22 | 20 | 30 | 22 |
|  |  | n-butylacrylate | 22 | 22 | 20 | 16 | 20 |
|  |  | 1,6-hexanedioldiacrylate | 2 | 4 | 10 | 2 | 8 |
|  |  | [KBM-503] | 4 | 2 |  | 2 |  |
|  | Emulsified Monomer (2) | [SE-10N] | 1 | 1 | 1 | 1 | 1 |
|  |  | Deionized water | 30 | 30 | 30 | 30 | 30 |
|  |  | styrene | 16 | 12 | 12 | 10 | 20 |
|  |  | n-butylacrylate | 16 | 12 | 12 | 20 | 22 |
|  |  | 1,6-hexanedioldiacrylate | 2 | 2 | 2 |  | 4 |

-continued

| Name of Emulsified Polymer | | Preparation Example | | | | |
|---|---|---|---|---|---|---|
| | | 3<br>B-1 | 4<br>B-2 | 5<br>B-3 | 6<br>B-4 | 7<br>B-5 |
| | [KBM-503] | 14 | 22 | 22 | 16 | |
| | 2-hydroxyethylacrylate | 2 | 2 | 2 | 4 | 4 |
| Solid content/% by weight | | 20 | 20 | 20 | 20 | 20 |
| Particle size/nm | | 120 | 110 | 102 | 128 | 123 |

Preparation Example of Emulsified Polymer by One-Stage Polymerization

Preparation Example 8

A reactor equipped with a thermometer, a thermostat, a reflux condenser and a drop device was charged with 298 parts of deionized water and kept at 90° C. To this reactor were added catalyst solution comprised of 0.15 parts of VA-086 nonionic water soluble catalyst and 9.85 parts of deionized water, and mixed for 15 minutes at 90° C. Another container was charged with 2 parts of SE-1ON reactive ammonium sulfate emulsifier, 60 parts of deionized water, 37 parts of styrene, 40 parts of n-butylacrylate, 4 parts of 1,6-hexanedioldiacrylate, 15 parts of KBM-503 γ-methacryloxypropyltrimethoxysilane, and 4 parts of 2-hydroxyethylacrylate, followed by mixing to prepare the emulsified monomer (3). The emulsified monomer (3) was then dropped into the reactor over a period of 4 hours at 90° C. At the same time as starting dropping emulsified monomer (3) into the reactor, a catalyst solution comprised of 0.55 parts of VA-086 nonionic water soluble catalyst, and 29.45 parts of deionized water were dropped into the reactor over a period of 5 hours at 90° C. After completion of emulsified monomer (3), the resulting mixture was reacted for 1 hour to obtain a milk-white emulsified polymer (B-6). The resulting emulsified polymer (B-6) had a solid content of 20% by weight, and an average particle size of 127 nm.

Preparation Example 9

Emulsified polymer (B-7) was prepared in the same manner as Preparation Example 8 according to the formulations of emulsified monomer (3) as follows:

| SE-1ON | 2 parts |
|---|---|
| deionized water | 60 parts |
| styrene | 38 parts |
| n-butylacrylate | 40 parts |
| 1,6-hexanedioldiacrylate | 10 parts |
| KBM-503 | 8 parts |
| 2-hydroxyethylacrylate | 4 parts |

The resulting emulsified polymer (B-7) had a solids content of 20% by weight, and an average particle size of 132 nm.

Example 1

A mixture of 77 parts of acrylic resin (A-1) varnish with 40 parts of melamine resin having about 3 methyl groups and about 3 butyl groups per one triazine nucleus (commercially available from Sanwa Chemical Co., Ltd. under the trade name Nikalac MX-430), containing about 57% of mononuclear compound and having a solids content of 100%, was mixed with triethylamine in an amount of 0.4 equivalent to the carboxyl group in acrylic resin (A-1). This was followed by mixing and water dispersing, slowly dropping deionized water with agitation in such an amount that a resin solids content would be 10% by weight. There were also added 75 parts of emulsified polymer (B-1) obtained in Preparation Example 3. The pH was adjusted to and maintained at 8.2, resin solids content to 10% by weight with triethylamine and deionized water to prepare coating composition (T-1)

Examples 2–7

Comparative Examples 1–3

Coating compositions (T-2)–(T-10) were prepared in the same manner as Example 1 according to the formulations shown table 2. In table 2, respective amounts of formulations are represented by solids content.

Anionic Electrodeposition Coating

Anodized aluminum materials having a film thickness of about 10 μm were subjected to the electrodeposition coating compositions (T-1) to (T-10) in an electrodeposition coating bath to give a dry film thickness of about 10 μm, followed by washing with water and heat curing at 170° C. for 30 minutes to obtain test panels.

Performance Test Methods

Every coating composition and test panel obtained above was evaluated as follows. Results are shown in Table 2.

600 Specular Reflection Percentage 600 specular reflection percentage was measured by gloss meter commercially available from SUGA TEST INSTRUMENTS CO. Ltd under the trade name UGV-50, and evaluated as follows:

⊙: Less than 10, ○: 10 or more, less than 25, Δ: 25 or more, less than 50, X: 50 or more Appearance The surface of a film was visually evaluated. good: no abnormality, poor: having unevenness of gloss, cissing, seeding, or dent on the film Adhesion Properties According to JIS H 8602 4.7, on the coated surface is formed 100 of 1 mm square by use of cutter. An adhesive cellophane tape is adhered to the squares, followed by strongly peeling the tape to observe squares remaining without being peeled off, and evaluated as follows. Good: the amount of remaining square are 100, poor: the amount of remaining square are 1–99.

Pencil Hardness Test

According to JIS H 8602 4.8, a core of a pencil was put against the test panel an angle of about 45°, and the pencil was pushed and moved about 10 mm by the frontwardly uniform speed, in order that the core not be broken. This operation was repeated five times with changing the test place, and the pencil hardness was decided as the hardness mark of the pencil when the coating was not torn more than four times.

TABLE 2

| | | | Example | | | | | | | Comparative Example | | |
|---|---|---|---|---|---|---|---|---|---|---|---|---|
| | | | 1 T-1 | 2 T-2 | 3 T-3 | 4 T-4 | 5 T-5 | 6 T-6 | 7 T-7 | 1 T-8 | 2 T-9 | 3 T-10 |
| Formulation | Acrylic resin varnish | A-1 | 45 | 50 | 45 | 45 | 45 | 45 | | 45 | 45 | 45 |
| | | A-2 | | | | | | | 45 | | | |
| | Emulsified polymer | Kind Amount | B-1 | B-1 | B-1 | B-2 | B-3 | B-4 | B-1 | B-6 | B-7 | B-5 |
| | Crosslinking agent | [Nikalac MX430] | 40 | 40 | 27 | 40 | 40 | 40 | 40 | 40 | 40 | 40 |
| | | [Desmodur BL-3175] | | | 13 | | | | | | | |
| Examination result | 60° Gross | Evaluation | ○ | ○ | ○ | ⊚ | ⊚ | ○ | ○ | Δ | Δ | X |
| | | Measured value | 14.5 | 19.8 | 18.7 | 8.2 | 7.0 | 17.7 | 15.6 | 32.5 | 48.2 | 62.3 |
| | Appearance | | Good | Good | Good | Good | Good | Good | Good | Good | Good | Good |
| | Adhesion properties | | Good | Good | Good | Good | Good | Good | Good | Good | Good | Good |
| | Pencil hardness | | 4H | 4H | 3H | 4H | 4H | 4H | 4H | 4H | 4H | 4H |

[DESMODUR BL-3175]: trade name, SUMITOMO BAYER. URETHANE CO. Ltd., blocked hexamethylene diisocyanate by oxymes, solid content of % 100 by weight.

What is claimed is:

1. An anionic electrodeposition coating composition comprising (a) about from 20 to 70% by weight of acrylic resin; (b) about from 5 to 40% by weight of emulsified polymer containing alkoxysilyl groups having a shell-core construction produced by two stage emulsion polymerization of unsaturated monomers, wherein about from 5 to 40% by weight of the unsaturated monomers used in the two stage emulsion polymerization contain alkoxysilyl groups, and the polymerization is carried out in the presence of water and emulsifier, and (c) about from 20 to 60% by weight of at least one crosslinking agent, and wherein in the second stage emulsion polymerization of unsaturated monomers, about from 20 to 90% by weight of the unsaturated monomers used in the second stage emulsion polymerization contain alkoxysilyl groups.

2. An anionic electrodeposition coating composition of claim 1, wherein the acrylic resin has an acid value of about from 5 to 150 mg KOH/g.

3. An anionic electrodeposition coating composition of claim 1 or 2 wherein the acrylic resin has a hydroxyl value of about from 5 to 150 mg KOH/g.

4. An anionic electrodeposition coating composition of claim 1 wherein the alkoxysilyl group-containing emulsified polymer having shell-core construction produced by the two-stage emulsion polymerization contains, in the first stage emulsion polymerization reaction product, structural units derived from monomers having two or more unsaturated groups in each molecule.

5. An anionic electrodeposition coating composition of claim 1 wherein the crosslinking agent is selected from melamine resin and/or blocked polyisocyanate compound.

6. An anionic electrodeposition bath which comprises an anionic electrodeposition coating composition of claim 1.

7. A process comprising applying an anionic electrodeposition coating composition of claim 1 onto a metal substrate and curing the composition.

8. A process of claim 7 wherein the substrate as aluminum.

9. An article resulting from the process of claim 7.

10. A metal substrate coated with a cured anionic electrodeposition coating composition of claim 1.

* * * * *

UNITED STATES PATENT AND TRADEMARK OFFICE
CERTIFICATE OF CORRECTION

PATENT NO. : 6,743,834 B2  Page 1 of 1
APPLICATION NO. : 09/974628
DATED : June 1, 2004
INVENTOR(S) : Yokoyama et al.

It is certified that error appears in the above-identified patent and that said Letters Patent is hereby corrected as shown below:

In section (75) Inventors change "Kamikado Koji" to --Koji Kamikado--

In section (73) Assignee change "Kansai Taint Co., Ltd." to --Kansai Paint Co., Ltd.--

In section (56) References Cited:

In "Foreign Patent Documents" change "JP 6-24519" to --JP 62-24519--

Signed and Sealed this

Twenty-second Day of January, 2008

JON W. DUDAS
*Director of the United States Patent and Trademark Office*